(12) United States Patent
Lin

(10) Patent No.: US 6,672,812 B1
(45) Date of Patent: Jan. 6, 2004

(54) WOOD SCREW WITH DIFFERENT SHANK RADII

(76) Inventor: Chao-Wei Lin, 16F-1, No. 179, Sec. 1, Chang-Jung Rd., E. Dist., Tainan City (TW)

( * ) Notice: Subject to any disclaimer, the term of this patent is extended or adjusted under 35 U.S.C. 154(b) by 0 days.

(21) Appl. No.: 10/261,924

(22) Filed: Sep. 30, 2002

(51) Int. Cl.[7] ................................................ F16B 25/02
(52) U.S. Cl. ................................................... 411/387.2
(58) Field of Search .................... 411/386, 387.1–387.8, 411/411, 412, 413, 308–311

(56) References Cited

U.S. PATENT DOCUMENTS

| | | | |
|---|---|---|---|
| 2,263,137 A | * | 11/1941 | Oestereicher |
| 2,371,365 A | * | 3/1945 | Tomalis |
| 4,323,326 A | * | 4/1982 | Okada |
| 4,834,602 A | * | 5/1989 | Takasaki |
| 4,874,278 A | | 10/1989 | Kawashita |
| 4,878,793 A | * | 11/1989 | Hewison |
| 5,015,134 A | * | 5/1991 | Gotoh |
| 5,827,030 A | * | 10/1998 | Dicke |

FOREIGN PATENT DOCUMENTS

DE    253960    * 4/1977

* cited by examiner

*Primary Examiner*—Flemming Saether
(74) *Attorney, Agent, or Firm*—Ostrolenk, Faber, Gerb & Soffen, LLP

(57) ABSTRACT

A wood screw includes a head part, a tapered insert part, and a shank part disposed between the head part and the tapered insert part. The shank part has first and second shank segments adjacent to the head part and the tapered insert part, respectively. The first shank segment has a first radius. The second shank segment has a surface that is formed with a screw thread. The screw thread includes interconnected thread sections that have a second radius larger than the first radius. The surface of the second shank segment is further formed with at least one projecting element between two neighboring interconnected ones of the thread sections that are proximate to the tapered insert part. The projecting element has a greatest radial dimension with respect to the shank axis that is greater than the first radius and less than the second radius.

9 Claims, 7 Drawing Sheets

WOOD SCREW WITH DIFFERENT SHANK RADII

BACKGROUND OF THE INVENTION

1. Field of the Invention

This invention relates to a wood screw, more particularly to a wood screw with a low driving torque requirement.

2. Description of the Related Art

Referring to FIG. 1, a conventional wood screw 1 is shown to include a head 11 and a shank 12 extending from the head 11 and formed with a screw thread 13. It is noted that when the conventional wood screw 1 is in use, a large driving torque is required, which can result in breaking of the same.

To overcome the aforesaid drawback, another conventional wood screw 2 has been proposed heretofore in U.S. Pat. No. 4,874,278, and includes a head 21, a shank 22 extending from the head 21, and a chip-removing portion 24 disposed between a tip guide portion 23 and a fastening screw portion 25 of the shank 22, as best shown in FIG. 2. In accordance with this design, chips produced at a time when a hole is bored are conveyed and spread toward the side of the shank 22 attached to the head 21 by this chip-removing portion 24. Therefore, blocking by chips can be prevented, and screw driving with low torque can be achieved.

However, because the structure of the chip-removing portion 24 is difficult to form, a high manufacturing cost cannot be avoided. Moreover, due to the configuration of the chip-removing portion 24, over-boring can occur and can reduce the holding effect between the wood screw 2 and wood material.

SUMMARY OF THE INVENTION

Therefore, the object of the present invention is to provide a wood screw with a low driving torque requirement, which can be produced at a relatively low cost, and which can maintain a sufficient holding effect with wood material.

According to this invention, a wood screw includes a head part, a tapered insert part, and a shank part disposed between the head part and the tapered insert part and having a shank axis. The shank part has a first shank segment adjacent to the head part, and a second shank segment adjacent to the tapered insert part. The first shank segment has a first radius relative to the shank axis. The second shank segment has a surface that is formed with a screw thread. The screw thread includes interconnected thread sections that have a second radius relative to the shank axis and larger than the first radius. The surface of the second shank segment is further formed with at least one projecting element between two neighboring interconnected ones of the thread sections that are proximate to the tapered insert part. The projecting element has a greatest radial dimension with respect to the shank axis that is greater than the first radius and less than the second radios.

In one embodiment, all of the thread sections on the surface of the second shank segment have the second radius relative to the shank axis.

In another embodiment, the two neighboring interconnected ones of the thread sections on the surface of the second shank segment have a third radius relative to the shank axis that is greater than the first radius and less than the second radius, and remaining ones of the thread sections on the surface of the second shank segment have the second radius relative to the shank axis. Preferably, the third radius is not less than the greatest radial dimension of the projecting element.

BRIEF DESCRIPTION OF THE DRAWINGS

Other features and advantages of the present invention will become apparent in the following detailed description of the preferred embodiments of the present invention, with reference to the accompanying drawings, in which.

DETAILED DESCRIPTION OF THE PREFERRED EMBODIMENTS

Figure 1:
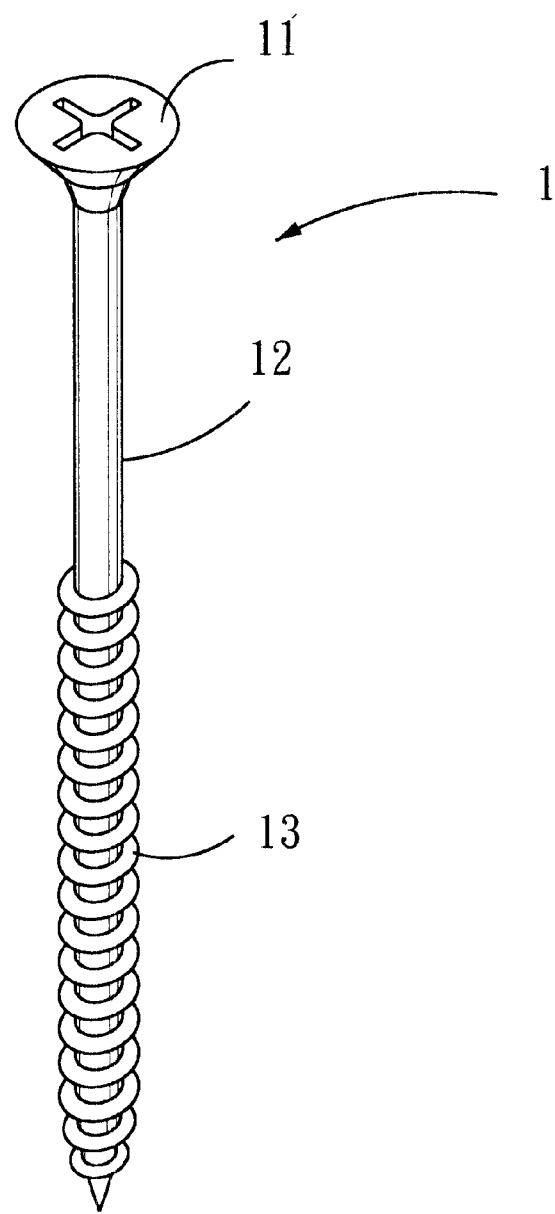
FIG. 1 is a perspective view of a conventional wood screw.
Figure 2:
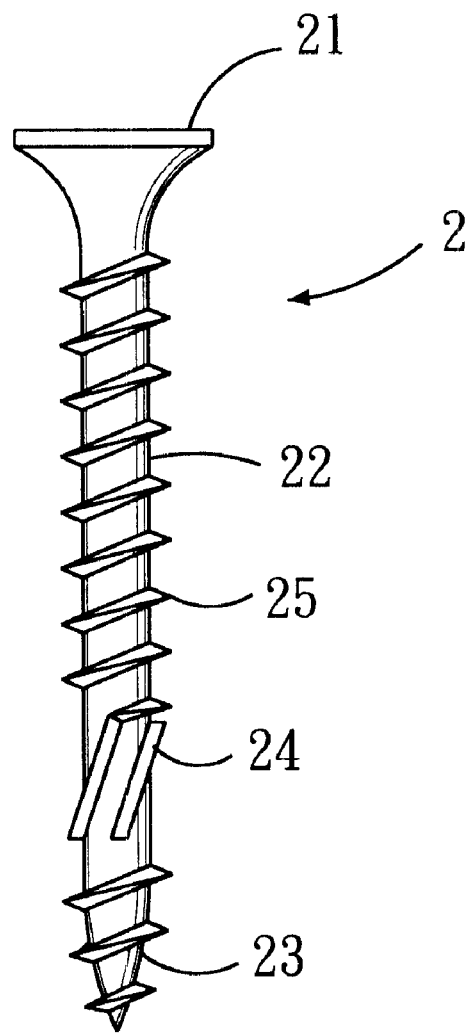
FIG. 2 illustrates another conventional wood screw.
Figure 3:
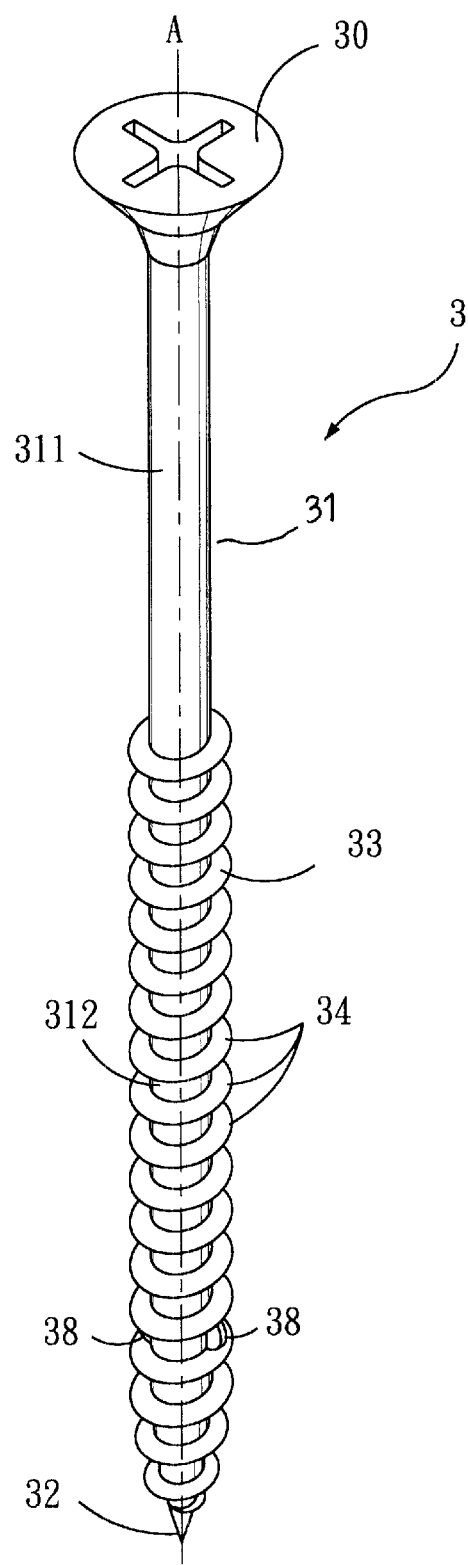
FIG. 3 is a perspective view of a first preferred embodiment of the wood screw according to the present invention.
Figure 4:
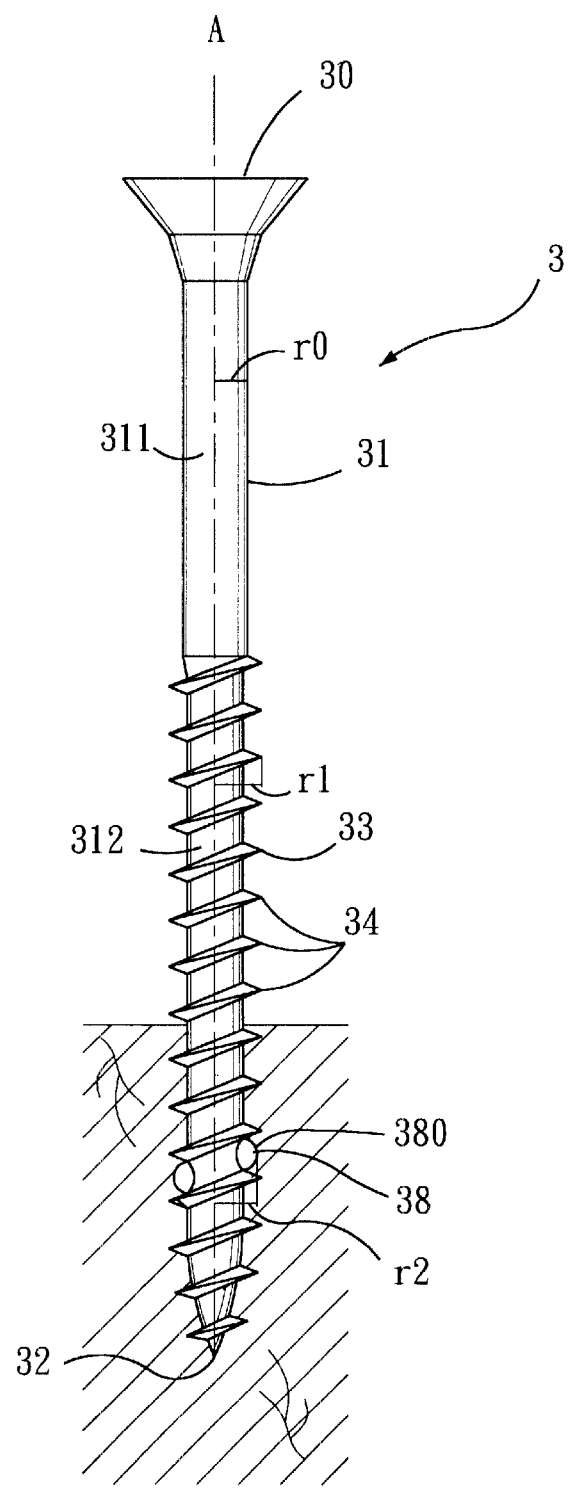
FIG. 4 is a schematic partly sectional view illustrating the first preferred embodiment of the present invention when driven into a wooden object.

Referring to FIGS. 3 and 4, the first preferred embodiment of the wood screw 3 according to the present invention is shown to include a head part 30, a tapered insert part 32, and a shank part 31 disposed between the head part 30 and the tapered insert part 32 and having a shank axis (A). The shank part 31 includes a first shank segment 311 adjacent to the head part 30, and a second shank segment 312 adjacent to the tapered insert part 32. The first shank segment 311 has a non-threaded surface, and a first radius (r0) relative to the shank axis (A). The second shank segment 312 has a surface that is formed with a screw thread 33. The screw thread 33 includes interconnected thread sections 34. In this embodiment, all of the thread sections 34 on the surface of the second shank segment 312 have a second radius (r1) relative to the shank axis (A). The second radius (r1) is larger than the first radius (r0). The surface of the second shank segment 312 is further formed with at least one projecting element 38 between two neighboring interconnected ones of the thread sections 34 that are proximate to the tapered insert part 32. The projecting element 38 has a greatest radial dimension (r2) with respect to the shank axis (A) that is greater than the first radius (r0) and less than the second radius (r1).

In this embodiment, the surface of the second shank segment 312 between the two neighboring interconnected ones of the thread sections 34 is provided with a pair of the projecting elements 38 that are diametrically opposite relative to the shank axis (A). Preferably, each projecting element 38 is formed as a plate that projects radially relative to the shank axis (A) and that has a convex shaving edge 380. The projecting elements 38 serve to enlarge the periphery of the hole formed by the tapered insert part 32 such that the torque necessary to drive the wood screw 3 into a wooden object is accordingly reduced. This low torque requirement also prevents the formation of cracks in the wooden object during the screw driving operation.

Figure 5:
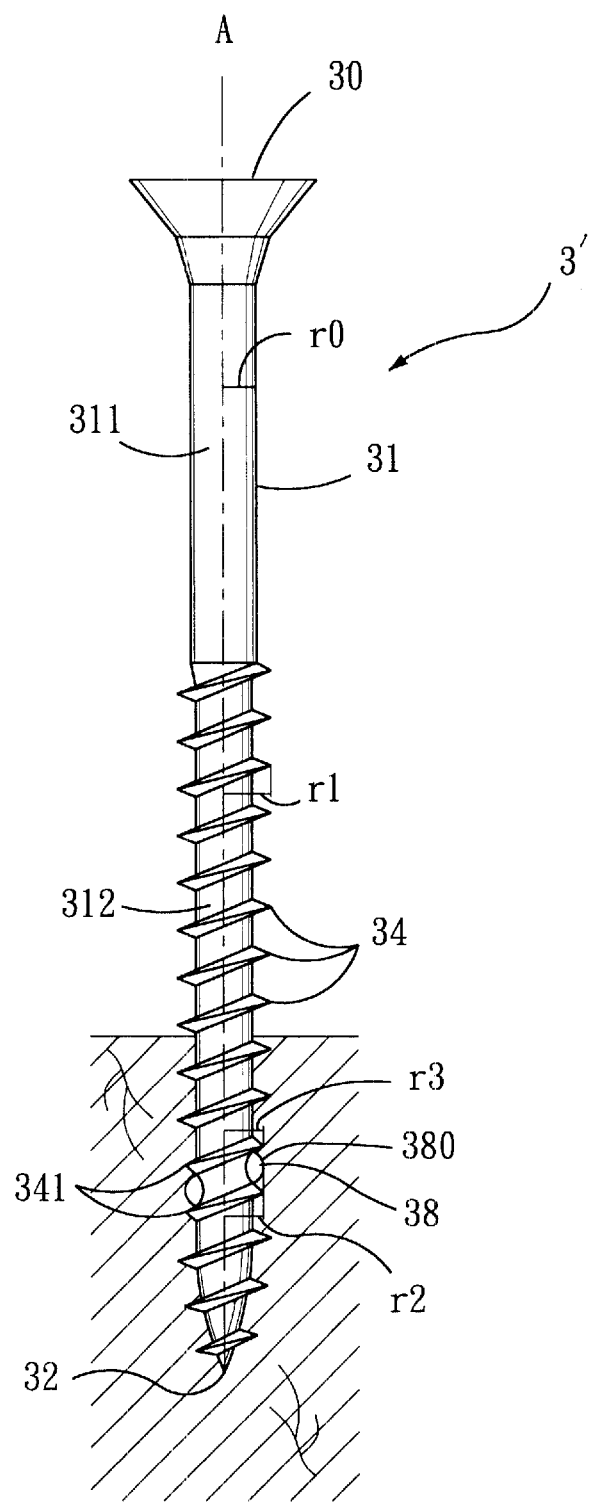
FIG. 5 is a schematic partly sectional view illustrating a second preferred embodiment of the wood screw according to the present invention when driven into a wooden object.

FIG. 5 illustrates a second preferred embodiment of the wood screw 3' according to the present invention. Unlike the previous embodiment, the two neighboring interconnected ones of the thread sections 341 on the surface of the second shank segment 312 have a third radius (r3) relative to the shank axis (A). The remaining ones of the thread sections 34 on the surface of the second shank segment 312 have the second radius (r1) relative to the shank axis (A). The third radius (r3) is greater than the first radius (r0) of the first shank segment 311 and is less than the second radius (r1). Moreover, the third radius (r3) is not less than the greatest radial dimension (r2) of the projecting elements 38.

Referring to Table 1, a driving torque test was performed to compare the driving torque requirements of a conventional wood screw 1 and a wood screw 3' of the present invention having the same dimensions.

TABLE 1

| Test sample | Driving torque (Kg.f.cm) | | Average (Kg.f.cm) |
|---|---|---|---|
| Conventional Wood screw 1 | 31.8 | 38.9 | 35.35 |
| Wood screw 3 of the present invention | 19.6 | 20.9 | 20.25 |

As evident from Table 1, the driving torque required for the wood screw 3' of the present invention is about 40% less as compared to the conventional wood screw 1.

Figure 6:
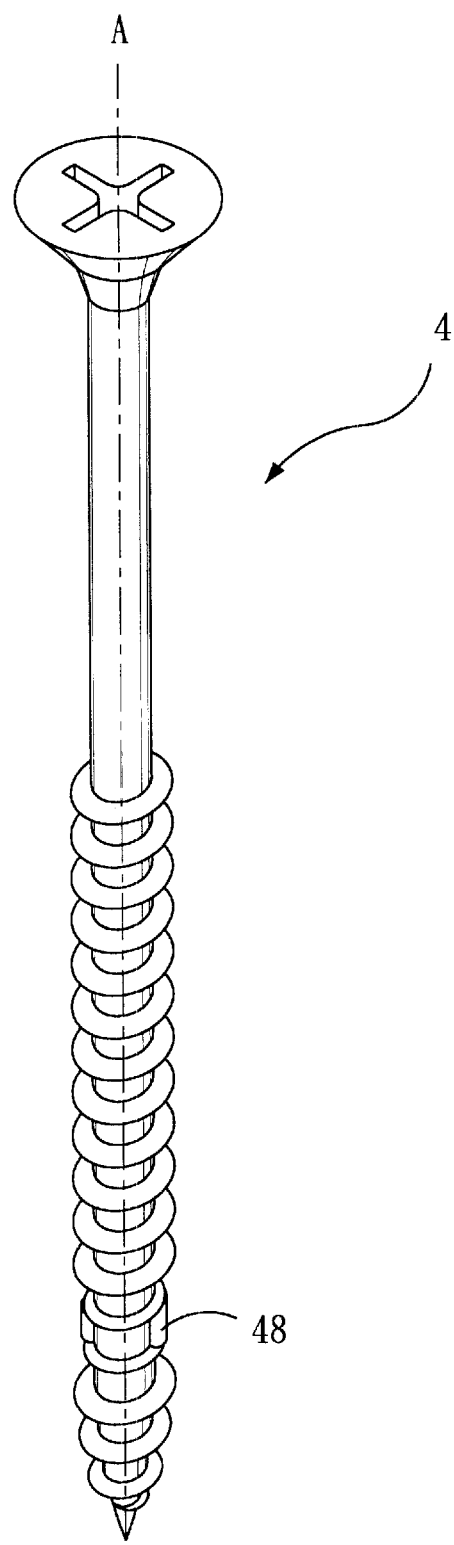
FIG. 6 is a perspective view of a third preferred embodiment of the wood screw according to the present invention.
Figure 7:
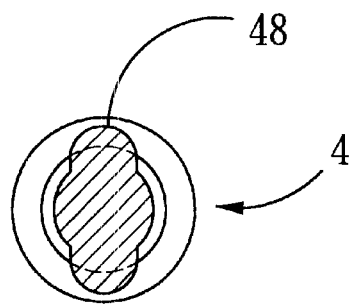
FIG. 7 is a cross-sectional view of the third preferred embodiment.

Referring to FIG. 6, in a third preferred embodiment of the wood screw 4 according to this invention, each projecting element 48 is formed as a rib that extends parallel to the shank axis (A). In this embodiment, each projecting element 48 has a rounded cross-section along a plane transverse to the shank axis (A) (see FIG. 7).

Figure 8:
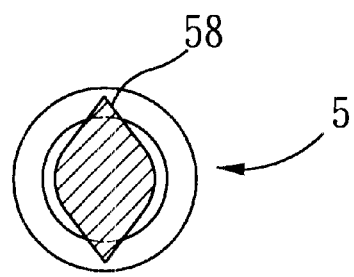
FIG. 8 is a cross-sectional view of a fourth preferred embodiment of the wood screw according to the present invention.

Referring to FIG. 8, in a fourth preferred embodiment of the wood screw 5 according to this invention, each projecting element 58 has a triangular or tapering cross-section along a plane transverse to the shank axis.

Figure 9:
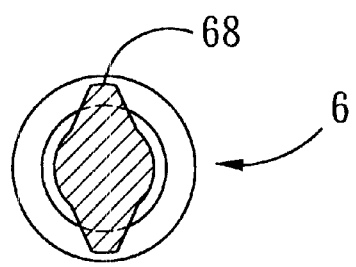
FIG. 9 is a cross-sectional view of a fifth preferred embodiment of the wood screw according to the present invention.

Referring to FIG. 9, in a fifth preferred embodiment of the wood screw 6 according to this invention, each projecting element 68 has a generally trapezium cross-section along a plane transverse to the shank axis.

By virtue of the configurations of the projecting elements, the wood screw of the present invention can be manufactured at a relatively low cost and fastened into a wooden object with a relatively low driving torque requirement and without reducing the holding effect between the wood screw and the wooden object. The object of the present invention is thus met.

While the present invention has been described in connection with what is considered the most practical and preferred embodiments, it is understood that this invention is not limited to the disclosed embodiments but is intended to cover various arrangements included within the spirit and scope of the broadest interpretations and equivalent arrangements.

I claim:

1. A screw comprising a head part, a tapered insert part and a shank part disposed between said head part and said tapered insert part and having a shank axis, said shank part having a first shank segment adjacent to said head part and a second shank segment adjacent to said tapered insert part, said first shank segment having a first radius relative to the shank axis, said second shank segment having a surface that is formed with a screw thread, said screw thread including interconnected thread sections that have a second radius relative to the shank axis and larger than the first radius, said surface of said second shank segment being further formed with at least one projecting element between two neighboring interconnected ones of said thread sections that are proximate to said tapered insert part, said projecting element having a greatest radial dimension with respect to the shank axis that is greater than the first radius and less than the second radius; said two neighboring interconnected ones of said thread sections on said surface of said second shank segment have a third radius relative to the shank axis that is greater than the first radius and less than the second radius, and remaining ones of said thread sections on said surface of said second shank segment have the second radius relative to the shank axis.

2. The screw of claim 1, wherein all of said thread sections on said surface of said second shank segment have the second radius relative to the shank axis.

3. The screw of claim 1, wherein the third radius is not less than the greatest radial dimension of said projecting element.

4. The screw of claim 1, wherein said surface of said second shank segment between said two neighboring interconnected ones of said thread sections is provided with a pair of said projecting elements that are diametrically opposite relative to the shank axis.

5. The screw of claim 1, wherein said projecting element is formed as a plate that projects radially relative to the shank axis and that has a convex shaving edge.

6. The screw of claim 1, wherein said projecting element is formed as a rib that extends parallel to the shank axis.

7. The screw of claim 6, wherein said projecting element has a round cross-section along a plane transverse to the shank axis.

8. The screw of claim 6, wherein said projecting element has a tapering cross-section along a plane transverse to the shank axis.

9. The screw of claim 6, wherein said projecting element has a generally trapezium cross-section along a plane transverse to the shank axis.

* * * * *